United States Patent [19]

Codo

[11] 3,883,430
[45] May 13, 1975

[54] FILTER AND BYPASS VALVE ARRANGEMENT

[75] Inventor: Edward A. Codo, Joliet, Ill.

[73] Assignee: Caterpillar Tractor Company, Peoria, Ill.

[22] Filed: Feb. 20, 1973

[21] Appl. No.: 334,090

[52] U.S. Cl.............. 210/132; 210/172; 210/232; 210/238
[51] Int. Cl............................................ B01d 27/10
[58] Field of Search .......... 137/454.2; 210/90, 130, 210/132, 172, 232, DIG. 14, 131, 133, 238

[56] References Cited
UNITED STATES PATENTS

| | | | |
|---|---|---|---|
| 2,811,218 | 10/1957 | Winslow | 210/172 X |
| 3,022,764 | 2/1962 | Scavuzzo et al. | 210/90 X |
| 3,042,076 | 7/1962 | Scavuzzo | 210/90 X |
| 3,214,023 | 10/1965 | Donner | 210/172 |
| 3,288,290 | 11/1966 | Rosaen | 210/172 X |
| 3,469,697 | 9/1969 | Kudlaty | 210/132 |
| 3,666,101 | 5/1972 | Rosaen | 210/172 X |

Primary Examiner—Frank A. Spear, Jr.
Assistant Examiner—Robert G. Mukal
Attorney, Agent, or Firm—Phillips, Moore, Weissenberger, Lempio & Strabala

[57] ABSTRACT

A system for filtering hydraulic fluid wherein a high flow rate of uncontaminated fluid is required. A filling facility is provided for initial filling or for the addition of make-up fluid to the system which facility assures that such added fluid must pass through a filtration unit prior to integration with fluid already in the system. A by-pass valve is provided to provide pressure relief in the event that the filtration unit becomes clogged during use. The valve, along with an accompanying coarse filtration unit, are readily manually removable from the system for cleaning or repair.

9 Claims, 5 Drawing Figures

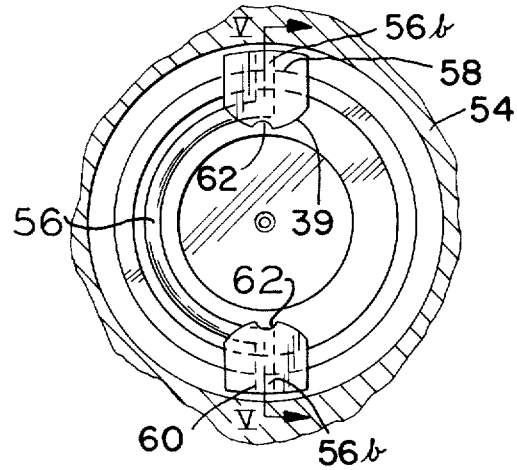
Fig_3_
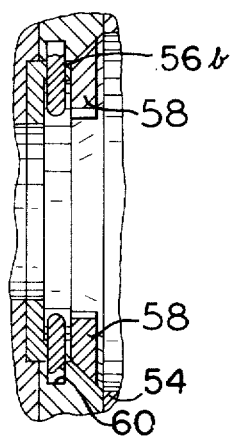
Fig_5_
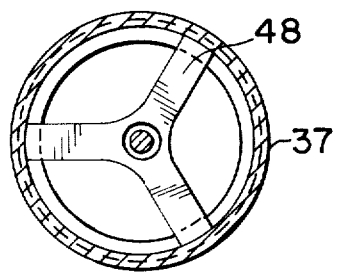
Fig_4_
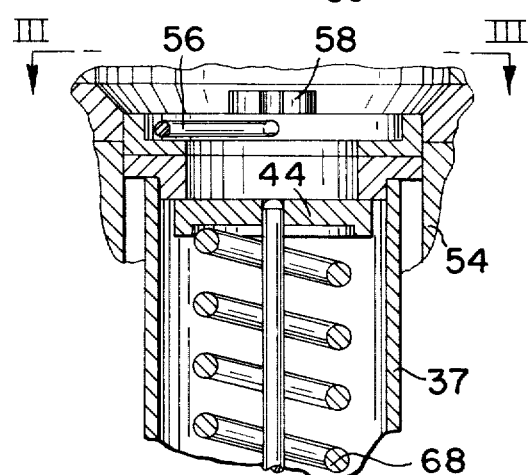
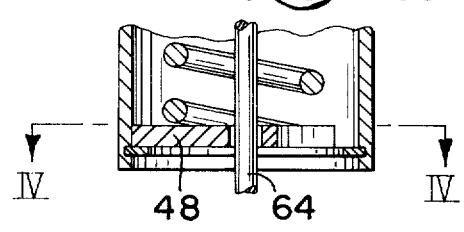
Fig_2_

FILTER AND BYPASS VALVE ARRANGEMENT

BACKGROUND OF THE INVENTION

In complex hydraulic systems wherein a large number of hydraulic components are utilized and wherein the functions of the components are inter-related, fluid filtration becomes an extremely important consideration. In such systems, a very high fluid flow rate is often required and it becomes imperative to assure that an extremely clean hydraulic fluid is utilized.

Oftimes hydraulic fluid becomes contaminated during transportation from its source to the user facility. If such contaminated fluid is added directly to an unfiltered portion of a high-rate hydraulic system, component damage can result before such contaminated fluid is passed through the filtration system provided. Conventional systems have no provision for the immediate filtration of such additive fluid. Furthermore, when high flow rates are desired, a large filtration area must be provided so that differential pressure across the individual filter elements, due to contaminant removal from fluid flow, may be kept low to assure that efficient operation of the components will not be impeded.

Also, in conventional systems, some sort of relief valving arrangement is usually provided to avoid excessive pressure buildup and so that if the filtration unit becomes clogged, unfiltered fluid can by-pass into the fluid circuit. While such unfiltered relief flow does protect against damage due to excessive pressure, the aforementioned problems of contamination of the components are still present.

Many conventional systems which utilize a by-pass or relief valve arrangement in conjunction with a filtration unit usually prove somewhat unaccessible for servicing or component replacement.

SUMMARY AND OBJECTS OF THE INVENTION

The instant invention attempts to solve the just enumerated problems by providing a filtration and pressure relief system which incorporates a filling spout for the admission of hydraulic fluid to the system which spout communicates immediately with the filtration unit and requires that additive fluid be filtered prior to entrance into the system. The present system also incorporates a by-pass valve and strainer arrangement which is readily accessible through the aforementioned spout means for cleaning and repair. The filtration units in the instant system are readily removable by means of the disconnection of a single fastening means.

It is an object of the present invention to provide a filtration system having a readily removable by-pass valve and a secondary gross filtration device.

Another object of the present invention is to provide a filling means for a hydraulic system which requires that fluid added to the system must pass immediately through a filtration means.

Yet another object of the instant invention is to provide a filtration arrangement wherein the individual filter units are readily replaceable.

Other objects and advantages of the invention will become apparent from the following description and drawings.

BRIEF DESCRIPTION OF THE DRAWINGS

FIG. 2 is an enlarged sectional view of the by-pass valve means shown in FIG. 1;

FIG. 3 is a plan view of the by-pass valve arrangement taken along the line III—III of FIG. 2;

FIG. 4 is a plan view of a portion of the by-pass valve arrangement taken along the line IV—IV of FIG. 2; and FIG. 5 is a sectional view of the retaining means for the by-pass valve arrangement taken along the line V—V of FIG. 3.

DETAILED DESCRIPTION

Figure 1:
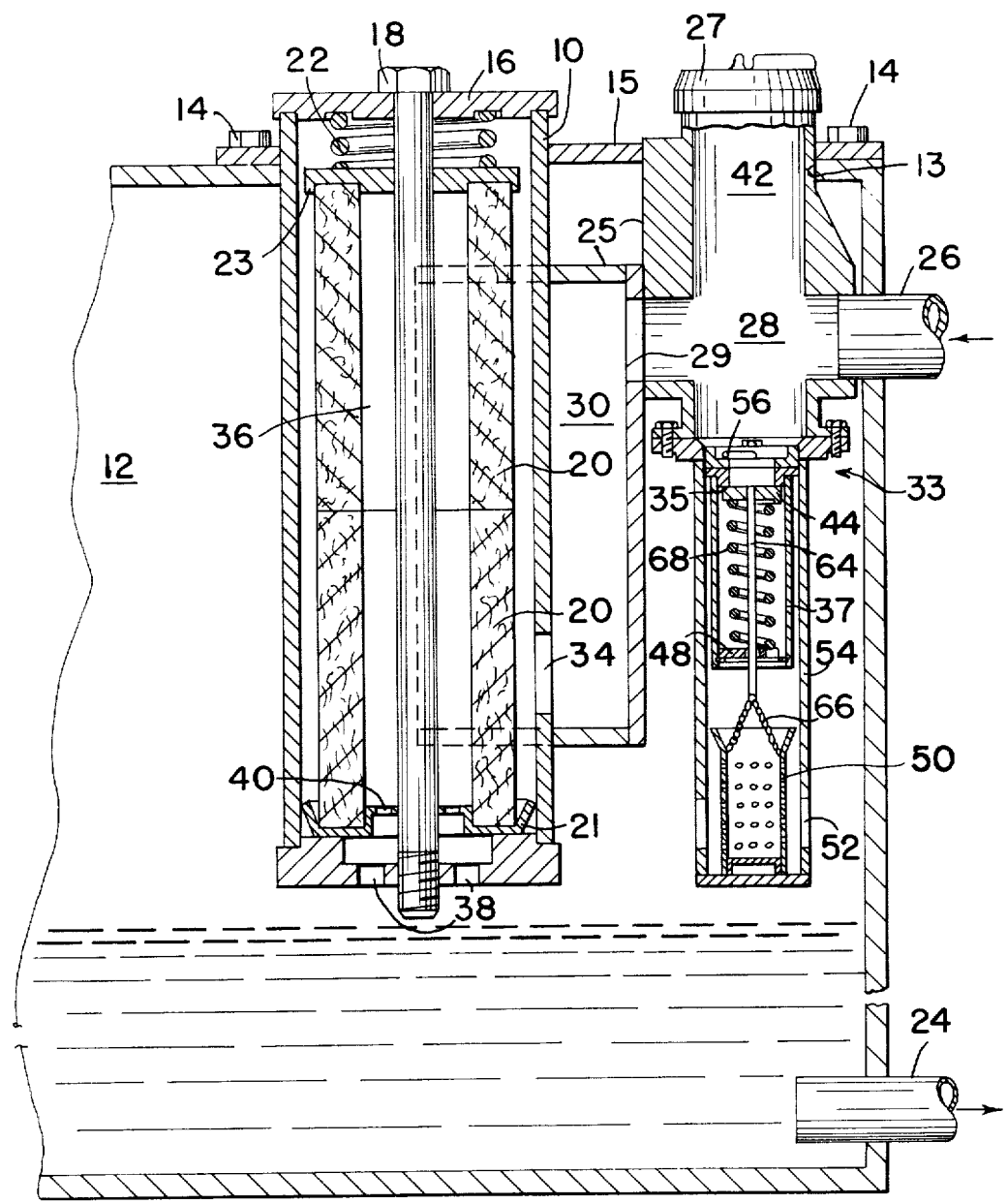
FIG. 1 is a cross-sectional elevation of the filter and by-pass valve arrangement of the instant invention.

With reference to FIG. 1 in the drawings, the context of the present invention can be seen. A hydraulic fluid supply tank, part of which is shown at 12, has an outlet conduit at 24 which, under normal circumstances, would communicate with the inlet side of a pump (not shown) which pump would supply hydraulic fluid to a plurality of user components (not shown). The return flow from such components would be returned to the fluid supply tank 12 through a return conduit 26.

The filter and by-pass assembly of the present invention is shown incorporated into a portion of the supply tank 12. The entire assembly may be inserted into an opening 13 in a portion of the supply tank and attached therein by means of cap screws 14 or the like and a mounting cover or plate 15. Included in the assembly is a filter housing 10 having a readily removable cover member 16 fastened to said housing by means of a bolt 18 or the like. It will be noted that the housing 25 is affixed, such as by welding, to the filter housing 10. Within the filter housing a pair of filter elements 20 are disposed end to end within a cup-like retaining or mounting member 21. The filter units are retained in position by means of a plate member 23 and biasing means 22.

The by-pass valve assembly includes a housing 25 which includes a chamber 28 which chamber communicates with a second chamber 30 which leads to the filter housing 10.

A filler spout 42 is provided which has a removable cap 27 as shown. The diameter of the filler spout 42 is sufficiently large to allow the entry of an operator's hand for a purpose to be hereinafter explained. Initial filling of the tank 12 and the admission of make-up fluid to the system is accomplished only through the spout 42 and any fluid admitted through the spout 42 must pass through the chamber 28 and advance into the chamber 30 through a communicating aperture 29.

Once in the chamber 30, such fluid may pass only through a communicating aperture 34 to the interior of the filter housing 10 from whence it must pass through the filter elements 20 to the interior chamber 36 for eventual passage through the apertures 40 and 38 to the interior of the tank 12.

It can be readily seen that, by means of the apparatus just described, any fluid added to the system must first pass through the main filter units and that this insures that foreign material is not introduced to the system during initial filling or during fluid replenishment procedures. The only time such compulsory fine filtration would not occur would be when the filter unit elements 20 were clogged so as to prevent passage therethrough. Even in this case, however, the fluid would pass through the system by way of the by-pass valve assembly and would receive gross filtration before reaching system components as will be more fully explained hereinafter.

After an extended period of normal use or upon admission to the system of contaminated fluid, the filter unit 20 will become clogged. When this occurs, a differential pressure will be created between the chambers 30 and 36, the higher pressure existing in chamber 30. In order to dissipate this positive pressure in chamber 30 and to assure the continuance of flow into the system, the by-pass valve assembly, shown generally at 33, is provided.

The by-pass assembly includes a by-pass valve member 44 mounted upon a stem 64 and biased toward a seat 35 by means of a compression spring 68 or the like. The valve is normally held in a closed position by means of the spring 68. However, upon an increase over normal pressure in the chambers 28 and 30 to a predetermined extent, i.e. 25 psi, the valve member 44 will move away from the seat 35 to allow flow from the chamber 28, past a retainer member 48 shown in detail in FIG. 4, through a gross filtration basket 50 and a plurality of apertures 52 in a housing 54 to the tank interior. The gross filtration strainer basket 50 is directly in the path of the fluid transmitted through the by-pass valve assembly. The basket 50 is suspended by means of a chain 66 or the like from one end of the valve stem 64. This gross filtration basket catches any large particles which might be carried by the hydraulic fluid stream entering from the chamber 28. This remedial measure protects the system until such time as the main filter unit elements 20 can be replaced or cleaned. Thus it can be seen that the instant filtering by-pass assembly provides an absolute protection against the admission to the system of raw contaminated hydraulic fluid, even at such times when the primary filter units become clogged and inoperative and the fluid must be by-passed into the system without passage through such main filter units.

The rapid and facile replaceability of the instant assembly will now be described. Access to the interior filter housing 10 is apparent from an inspection of FIG. 1 of the drawings. By merely removing the single fastening means 18, the cap 16 may be removed, along with the spring 22 and retaining plate 23 to allow rapid removal of the filter units 20.

Removal of the by-pass valve assembly is accomplished in a similarly facile manner. The cap 27 is removed to allow the operator to either reach into the enlarged spout passage 42 with his hand or with a hooked tool, whereupon a retaining bail 56 may be engaged. With further reference to FIGS. 2, 3 and 5, it will be seen that the end portions 56b of the retaining bail member are disposed within recesses 60 within the by-pass valve housing 54. A sleeve assembly 37, which is disposed within the housing 54, is provided with two lug members 58. A curved ramped portion 39 and a notched portion 62 are provided on the lug members.

To remove the valve assembly, the operator would move the retaining bail 56 to a vertical position; i.e. 90° from the horizontal position normally occupied for retaining the by-pass valve assembly in place. When the bail is raised to the vertical position, it will contact the ramp portions 39 of the lugs and move along the outer periphery thereof such that the bail ends 56b will be retracted from the recesses 60 in the valve housing 54. When the bail is disposed in fully vertical position, it will lock in place in the notches 62 and the valve sleeve assembly 37 will be lifted, along the entire interior valve assembly and the gross filtration basket 50, out of the spout 42 for maintenance. The bail serves as a handle for supporting the weight of the valve assembly and basket during withdrawal.

In view of the foregoing, it should be apparent that the present invention provides an improved filtering and by-pass mechanism which effectively protects a hydraulic system against the admission of contaminated fluid and which provides facile accessability to all major components thereof. The system is uncomplicated and economically and efficiently performs the filtering and pressure relief functions required thereof.

While the invention has been described and shown with particular reference to the preferred embodiments, it will be apparent that variations and modifications are possible within the spirit of the inventive concepts that no limitation is intended, except by the scope of the appended claims.

I claim:

1. In a fluid supply system having fluid reservoir means for containing fluid utilized in said supply system, a combined filter and by-pass apparatus comprising; filling spout means for supplying fluid to said reservoir means, said spout means having inlet and outlet means, first chamber means in communication with said spout means outlet means, normally closed valve means having inlet means in communication with said first chamber means and outlet means in communication with said reservoir means, said valve means including housing means removably secured to said spout means, primary fluid filtering means having inlet means in communication with said first chamber means and having outlet means in communication with said reservoir means, said combined filter and by-pass apparatus being disposed at least partially within said reservoir means and positioned such that all fluid entering said supply system must pass through said first chamber means before entering said reservoir means, said normally closed valve means including a valve member secured within said valve housing means by retainer means, said valve member being manually removable from said valve housing means through said spout inlet means, said retainer means including bail means for co-acting with lug means and recess means to retain said valve member within said housing means.

2. The invention of claim 1 wherein said valve member has a head portion and a stem portion, and means normally biasing said valve member to a position in which said valve means inlet means is closed.

3. The invention of claim 2 further including secondary filter means for providing gross fluid filtration, said secondary filter means being disposed downstream of said valve means inlet means and in direct fluid communication with said valve means outlet means.

4. The invention of claim 3 wherein said secondary filter means includes a basket member which is removably secured to said stem portion for movement therewith.

5. The invention of claim 1 wherein said primary filtering means include a filter housing having a filter element disposed therein, and wherein said spout means include bore means formed in a rigid member, and wherein said filter housing, said rigid member and said valve housing means are attached together for unitary removal from said reservoir means.

6. The invention of claim 5 wherein said filtering means further include cup-like mounting means for said filter element, said mounting means having centrally disposed aperture means therein, said filter housing having passage means therein which communicate directly with said reservoir means, said aperture means and said passage means being substantially aligned, said mounting means and said filter element coacting to form second and third coaxially disposed chambers within said filter housing, said aperture means being in direct fluid flow communication with said second chamber and said first chamber means being in communication with said third chamber.

7. In a fluid supply system having fluid reservoir means for containing fluid utilized in said supply system, a combined filter and by-pass apparatus comprising; filling spout means for supplying fluid to said reservoir means, said spout means having inlet and outlet means, first chamber means in communication with said spout means outlet means, normally closed valve means having inlet means in communication with said first chamber means and outlet means in communication with said reservoir means, primary fluid filtering means having inlet means in communication with said first chamber means and having outlet means in communication with said reservoir means, said combined filter and by-pass apparatus being disposed at least partially within said reservoir means and positioned such that all fluid entering said supply system must pass through said first chamber means before entering said reservoir means, said valve means including a valve member having a head portion and a stem portion, and means normally biasing said valve member to a position in which said valve means inlet means is closed, secondary filter means for providing gross fluid filtration, said secondary filter means being disposed downstream of said valve means inlet means and in direct fluid communication with said valve means outlet means, said secondary filter means including a basket member which is removably secured to said stem portion for movement therewith, said valve means including housing means secured to said spout means and said valve member and said basket member being removably secured within said housing member by retainer means, said retainer means including bail means for coacting with lug means and recess means to retain said valve member with said housing means.

8. The invention of claim 7 wherein said bail means includes two end portions which engage said recess means to retain said valve member within said housing means when said bail member means is disposed in a first predetermined position and which disengage said recess means to permit removal of said valve member and said bail means from said housing means when said bail means is disposed in a second predetermined position.

9. The invention of claim 8 wherein said first and second predetermined positions are spaced angularly 90° apart and when said lug means include notch means for locking said bail means in said second position.

* * * * *